United States Patent Office 2,971,969
Patented Feb. 14, 1961

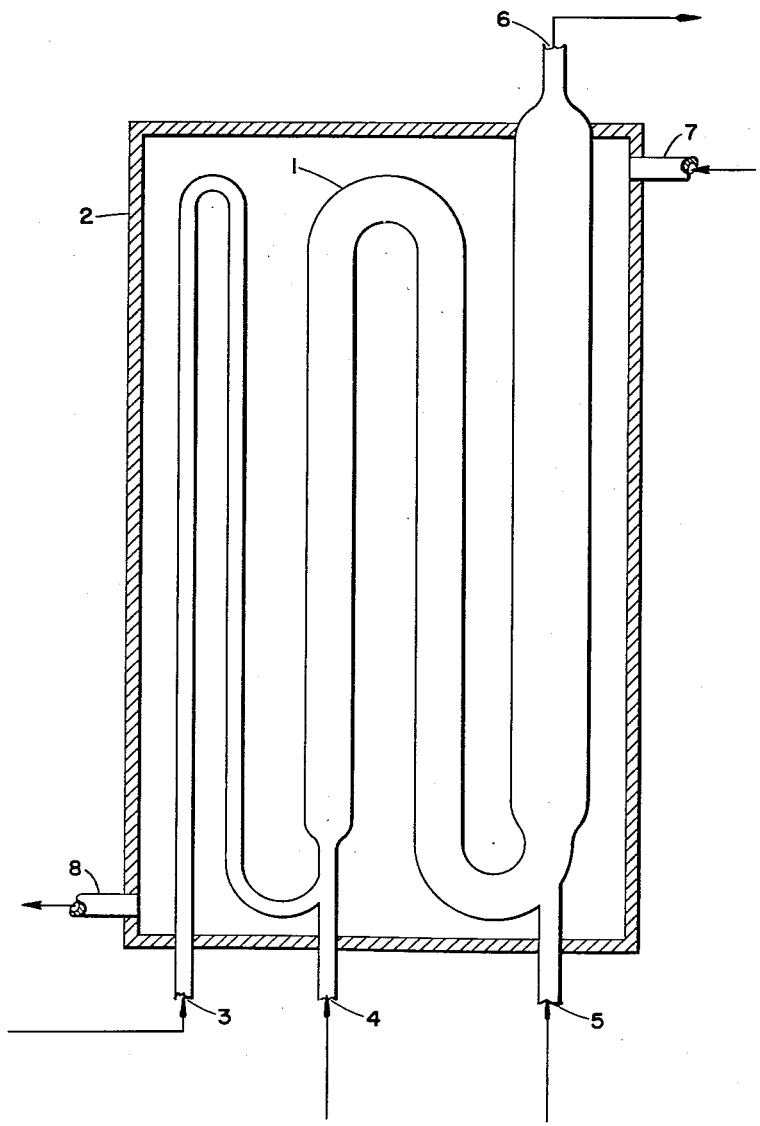

2,971,969

PREPARATION OF TRIALKYLALUMINUM COMPOUNDS

Paul A. Lobo, Ponca City, Okla., assignor to Continental Oil Company, Ponca City, Okla., a corporation of Delaware Filed Apr. 16, 1959, Ser. No. 806,965

6 Claims. (Cl. 260—448)

The present invention relates to the preparation of higher order trialkylaluminum compounds by reacting a lower order trialkylaluminum compound with ethylene. More particularly, the present invention relates to a method for the preparation of such compounds by a process wherein the heat of reaction can be effectively controlled.

The reaction whereby higher order trialkylaluminum compounds are formed by reacting a lower trialkylaluminum compound such as triethylaluminum with ethylene is usually carried out at a temperature varying from 100 to about 125° C., a pressure varying from 10 to about 300 atmospheres, and generally the reaction is carried out in the presence of a solvent. The polymerization of ethylene with a trialkylaluminum compound is highly exothermic. Essentially the heat evolved in this reaction is equivalent to the heat of polymerization of ethylene. The polymerization of ethylene can be represented by the equation:

$$xC_2H_4 \rightarrow (C_2H_4)_x$$

Kirk and Othmer, Encyclopedia of Chemical Technology, volume 10, give the following value for the heat evolved in this reaction as:

$$\Delta H_{298} = -22 \text{ kg.-cal./mole } C_2H_4$$

This high heat of reaction complicates the commercial operation for the controlled polymerization of ethylene with trialkylaluminum as the process must be operated within a very narrow temperature range for optimum yields.

At temperatures much below 110° C., the reaction is very slow; and as a result, a very high reaction time is necessary to obtain high yields of the higher ($C_{12+}$) alkylaluminum compounds. Although the reaction rate increases rapidly with temperature, temperatures much above 125° C. cannot be used, because the rate at which side reactions occur increase even more rapidly. These side reactions may be represented by the general formula:

$$Al\text{---}C_nH_{2n+1} \rightarrow C_nH_{2n} + AlH$$

(where Al denotes ⅓ mole of aluminum) take place to a large extent and decrease the yield of the desired trialkylaluminum based on ethylene.

In the initial stages of a controlled polymerization process, the heat release on reaction is higher on a unit mass basis than at any time during the reaction. As the alkyl groups grow in chain length, the increase in molecular weight has a dilution effect and decreases the heat of reaction on a unit mass basis. It is usually desirable to add a solvent to the alkylaluminum feed to dilute the feed stream as well as reduce the hazards involved in handling the material.

It is therefore a principal object of the present invention to provide a process for the production of such trialkylaluminum compounds whereby the heat of reaction is effectively controlled. It is another object of my invention to provide a process whereby the reaction can be carried out at a rapid rate. It is yet another object of my invention to provide a process whereby high yields of the higher order trialkylaluminum compounds can be produced utilizing inexpensive equipment. Other objects and advantages of the invention will become apparent as the description proceeds.

In accordance with the process of this invention, a trialkylaluminum having the formula:

$$Al\ R_1\ R_2\ R_3$$

wherein each of the R's may be the same or different alkyl radicals containing from 2 to 10 carbon atoms per radical, is reacted with ethylene under controlled conditions whereby ethylene is grown onto the trialkylaluminum compound. This may be represented by the following reaction wherein ethylene is grown onto triethylaluminum:

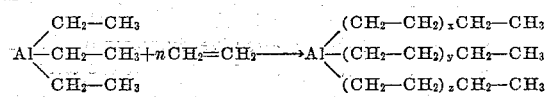

wherein $n$ is equal to the sum of $x$, $y$, and $z$ which in turn represent integers ranging from 0 to 49, and averaging between about 6 to 12. Somewhat more specifically, the process of the present invention may be described as a method whereby the trialkylaluminum compound is introduced into an elongated reaction vessel with a limited amount of ethylene. The elongated reaction vessel varies in cross-sectional area and is surrounded by a fluid heat exchange medium. The initial addition of the trialkylaluminum compound and ethylene is at the smaller end of the elongated reaction vessel. The reaction between the trialkylaluminum and the ethylene takes place as the two reactants pass through the reaction tube. In addition to the amount of ethylene added initially with the trialkylaluminum, an additional quantity of ethylene is added to the reaction vessel through inlets distributed along the axis of the reaction vessel between the initial inlet and the outlet. As to the amount added along the axis, that should as a minimum be sufficient to maintain saturation of the trialkylaluminum with ethylene at all times.

In the accompanying schematic drawing is illustrated a suitable apparatus for practicing the invention. It will be appreciated, however, that many changes in form and construction from the exact details shown in the drawing can be made without departing from the invention. Thus, while a single elongated reaction tube is shown in the drawing, a plurality of similarly constructed reaction tubes can, of course, be operated in parallel to obtain correspondingly greater production. The drawing is diagrammatic in form, and those skilled in the art will understand that numerous apparatus elements such as compressors, valves, coolers, condensers, controls, and the like will be necessary.

I have found that the apparatus of the present invention very greatly facilitates the controlled polymerization of ethylene with a trialkylaluminum compound. In addition to facilitating the reaction, I have discovered that by employing an apparatus wherein the length to diameter ratio is large, back-mixing is kept to a minimum.

In accordance with the invention, the initial portion of the reaction tube is caused to be of restricted effective diameter as compared with the remainder of the tube. The proportion of the total volume of the reactor tube which is caused to be of restricted effective diameter, namely, the initial portion is best chosen so that the polymerization reaction is initiated in the vicinity where such initial portion joins the remainder of the tube. In other words, the ethylene and the trialkylaluminum compound are caused to flow initially in a path of restricted effective diameter until polymerization is initiated and thereafter through a flow path of greater effective diameter than that initially used.

Another important factor in the process is the space velocity or dwell time. The ratio of the dwell time of ethylene in the initial portion of the reaction tube to the dwell time of the reaction mixture in the remainder of the tube is less than .35:1.0. In other words, the volume of the initial portion in which the flow path is of smaller effective diameter than the remaining portion constitutes about one-fourth or less of the total volume of the reaction tube. The ratios of the two volumes are numerically the same as the ratios of the two dwell times in said volumes. In most instances, the ratios of these dwell times will be within the range of 0.5:1.0 to .35:1.0. Generally, however, I prefer to employ the term "space velocity" rather than "dwell time," and it may be defined as:

$$S_v = \frac{\text{volume of liquid feed per hour}}{\text{volume of reactor}}$$

As a further guide as to the effective diameters of the reaction vessel, it may be said that the effective diameter of the initial portion should ordinarily be from about one-fourth to about one-half the effective diameter of the remaining portion. More broadly, the ratio of the effective diameter of the initial portion to the effective diameter of the remaining portion will almost always be within the approximate range of .2:1.0 to .8:1.0.

Referring to the drawing, the elongated reaction tube is designated by the numeral 1. It will be appreciated that this is high pressure equipment, and suitable steels and construction methods must be used. The reaction tube 1 is shown enclosed in a structure or vessel 2 through which a fluid heat exchange medium is passed entering through line 7 and exiting through line 8. Conveniently, the entering heating exchange fluid is at a temperature below the desired reaction temperature and during its flow across the latter portions of the reaction tube adsorbs the heat of reaction. Correspondingly, as the heat exchange fluid flows over the initial portion 9 of reactor tube 1, the ethylene flowing therethrough with the trialkylaluminum is brought to reaction temperature during its flow through the initial portion of the tube by adsorption of heat from the heat exchange medium in contact with the outside of the initial portion of the tube. Of course various other arrangements are permissible to accomplish the imparting of heat to the reaction mixture in the initial portion of the reaction tube and the abstraction of heat from the reaction mixture in the remainder of the tube. The initial portion of the reaction tube is defined as that portion of the tube located between the point at which the mixture of ethylene and trialkylaluminum are introduced and that point where the first addition of an additional quantity of ethylene is added therethrough, namely, between inlets 3 and 4 as illustrated in the drawing.

In the specific examples which follow, I have used boiling toluene as the heat exchange fluid. It will be apparent to those skilled in the art that other liquids may be employed. Also, it will be apparent that the temperature may be varied by varying the pressure of the liquid contained in the vessel 2.

In order to disclose the nature of the present invention still more clearly, the following illustrative examples will be given. It is to be understood that the invention is not to be limited to the specific conditions or details set forth in these examples except as such limitations are specified in the appended claims.

*Example 1*

Ethylene and triethylaluminum, diluted with kerosene, were introduced into a 7-tube vertical reactor. The tubes were 1" nominal pipe size, Schedule 80, and were constructed in a hairpin arrangement. A jacket containing boiling toluene enclosed the reactor tubes. Fifty percent of the ethylene was introduced into the reactor initially; the remainder was introduced at the middle of the tube length. Total reactor volume was 5,750 mls. Reaction data were as follows:

| Press (p.s.i.g.) | Temp. (° C.) | $S_v \left(\frac{1}{hr.}\right)$ | Feed AlEt₃ Conc., Vol. Percent | Feed Ratio, $\frac{\text{Moles } C_2H_4}{\text{Mole AlEt}_3}$ | Reacted, $\frac{\text{Moles } C_2H_4}{\text{Mole AlEt}_3}$ |
|---|---|---|---|---|---|
| 1,500 | 121 | 0.138 | 45.7 | 20.8 | 8.7 |

*Example 2*

Ethylene and triethylaluminum, diluted with kerosene, were introduced into a 55-tube vertical reactor. The tubes were 1" nominal pipe size, Schedule 80 and were constructed in a hairpin arrangement. A jacket containing boiling toluene enclosed the reactor tubes. All the ethylene was introduced into the first tube of the reactor. Total reactor volume was 20.7 gallons. Reaction data were as follows:

| Press (p.s.i.g.) | Temp. (° C.) | $S_v \left(\frac{1}{hr.}\right)$ | Feed AlEt₃ Conc., Vol. Percent | Feed Ratio, $\frac{\text{Moles } C_2H_4}{\text{Mole AlEt}_3}$ | Reacted, $\frac{\text{Moles } C_2H_4}{\text{Mole AlEt}_3}$ |
|---|---|---|---|---|---|
| 1,500 | 120 | 0.081 | 50.1 | 16.0 | 8.7 |

*Example 3*

A 2" nominal pipe size, Schedule 80 pipe was connected to the discharge end of the 55-tube 1" reactor used in Example 2. The 2" tube was also enclosed in a jacket containing boiling toluene. Operation of the combination reactor was satisfactory under the reaction conditions given in Example 2. Good temperature control was maintained in the 2" tube as only higher trialkylaluminum compounds entered this section of the reactor. Good temperature control was found to be unattainable in the 2" tube, however, if triethylaluminum solution and ethylene were introduced into the 2" tube initially and operated at the same space velocity. If, however, the space velocity is increased to a value approximately three times that found operable with the 1" tube, satisfactory results will be obtained using a 2" tube. I have found also that satisfactory results can be obtained using tubes having a diameter greater than 2 inches, provided the space velocity is increased a corresponding amount.

In Examples 1 and 2 wherein 8.7 moles of ethylene were reacted per mole of triethylaluminum, the reaction product was made up of a mixture of trialkylaluminum compounds. The percentage of the different trialkylaluminum compounds formed followed a statistical distribution also now known as a Poisson distribution. An analysis of the reaction product disclosed that the composition thereof was as follows:

Trialkylaluminum: Weight fraction
- $C_2$ ---- 0.01
- $C_4$ ---- 0.07
- $C_6$ ---- 0.17
- $C_8$ ---- 0.24
- $C_{10}$ ---- 0.25
- $C_{12}$ ---- 0.15
- $C_{14}$ ---- 0.07
- $C_{16}$ ---- 0.03
- $C_{18}$ ---- 0.01
- $C_{20}$ ---- 0.00
- $C_{22}$ ---- 0.00

As a result of my experiments, I have found that satisfactory operating conditions in respect to temperature and pressure may range from about 50 to 200° C. and 10 to 300 atmospheres. Generally, however, I prefer to operate within a temperature and pressure range of from 100 to 150° C. and 50 to 100 atmospheres, respectively.

While particular embodiments of the invention have been described, it will be understood, of course, that the invention is not limited thereto, since many modifications may be made; and it is therefore contemplated to cover by the appended claims any such modifications as fall within the true spirit and scope of the invention.

The invention having thus been described, what is claimed and desired to be secured by Letters Patent is:

1. A process for the production of trialkylaluminum compounds of the general formula $$Al\ RR'R''$$

wherein the R's may be the same and represent alkyl groups containing from 2 to 100 carbon atoms characterized further in that at least one of said R's contains at least three carbon atoms which comprises passing a trialkylaluminum compound of the general formula $$Al\ R_1R_2R_3$$

wherein the R's may be the same and represent alkyl groups containing from 2 to 10 carbon atoms and ethylene through an elongated reaction vessel, one end of which is of larger cross section than the other, at a temperature varying from 50 to 200° C. and at a pressure varying from 10 to 300 atmospheres, said reaction vessel being provided with an inlet at the smaller end, an outlet at the larger end, and a plurality of inlets spaced along the axis of elongation of said elongated reaction vessel between said first-mentioned inlet and said outlet, injecting a mixture of ethylene and the second-mentioned trialkylaluminum compound into said reaction vessel through the first-mentioned inlet in the approximate ratio of 0.25 to 12 parts of ethylene per part of the trialkylaluminum compound whereby reaction between the ethylene and the trialkylaluminum compound results, injecting an additional quantity of ethylene into said reaction vessel through the inlets distributed along the axis thereof, the additional quantity of ethylene so injected being an amount which is in excess of that required to saturate the trialkylaluminum compound contained therein with ethylene and then recovering the trialkylaluminum compounds formed.

2. The process of claim 1 wherein the temperature and pressure employed varied from 100 to 150° C. and 50 to 150 atmospheres, respectively.

3. The process of claim 1 wherein the ratio of the space velocity in the initial portion of the reaction vessel to that in the latter portion is less than 0.35:1.

4. The process of claim 1 wherein the ratio of the space velocity in the initial portion of the reaction vessel to that in the latter portion varies from 0.05:1.0 to 0.35:1.

5. The process of claim 1 wherein the second-mentioned trialkylaluminum compound is triethylaluminum.

6. The process according to claim 1 wherein the temperature and pressure employed vary from 100 to 150° C. and 50 to 150 atmospheres, respectively, and wherein the ratio of the space velocity in the initial portion of the reaction vessel to that in the latter portion varies from 0.05:1.0 to 0.35:1.0, the process being characterized still further in that the second-mentioned trialkylaluminum is triethylaluminum.

References Cited in the file of this patent

UNITED STATES PATENTS 2,863,896    Johnson  _____ Dec. 9, 1958

UNITED STATES PATENT OFFICE
CERTIFICATE OF CORRECTION

Patent No. 2,971,969                      February 14, 1961

Paul A. Lobo

It is hereby certified that error appears in the above numbered patent requiring correction and that the said Letters Patent should read as corrected below.

Column 3, line 14, for "0.5:1.0" read -- .05:1.0 --.

Signed and sealed this 23rd day of October 1962.

(SEAL)
Attest:

ERNEST W. SWIDER
Attesting Officer

DAVID L. LADD
Commissioner of Patents